United States Patent
Pan et al.

(10) Patent No.: US 10,952,122 B2
(45) Date of Patent: Mar. 16, 2021

(54) INTELLIGENT BRIDGE ACCELERATION METHOD AND SYSTEM BASED ON DUAL-COMMUNICATION DEVICE

(71) Applicant: Sichuan Subao Network Technology Co., Ltd., Chengdu (CN)

(72) Inventors: Kun Pan, Chengdu (CN); Xin Li, Chengdu (CN); Yanjun Qin, Chengdu (CN)

(73) Assignee: Sichuan Subao Network Technology Co., Ltd., Chengdu (CN)

( * ) Notice: Subject to any disclaimer, the term of this patent is extended or adjusted under 35 U.S.C. 154(b) by 16 days.

(21) Appl. No.: 16/419,031

(22) Filed: May 22, 2019

(65) Prior Publication Data

US 2020/0252852 A1 Aug. 6, 2020

(30) Foreign Application Priority Data

Feb. 2, 2019 (CN) .......................... 201910107762.4

(51) Int. Cl.

| | |
|---|---|
| *H04W 40/12* | (2009.01) |
| *H04W 40/18* | (2009.01) |
| *H04W 48/18* | (2009.01) |
| *H04W 36/00* | (2009.01) |
| *G06F 17/13* | (2006.01) |

(52) U.S. Cl.
CPC ....... *H04W 40/12* (2013.01); *H04W 36/0027* (2013.01); *H04W 40/18* (2013.01); *H04W 48/18* (2013.01); *G06F 17/13* (2013.01)

(58) Field of Classification Search
None
See application file for complete search history.

(56) References Cited

U.S. PATENT DOCUMENTS

| | | | |
|---|---|---|---|
| 2007/0082671 A1* | 4/2007 | Feng ...................... | H04L 51/00 455/436 |
| 2008/0019339 A1* | 1/2008 | Raju ...................... | H04W 48/18 370/338 |
| 2008/0102843 A1* | 5/2008 | Todd ..................... | H04W 36/18 455/445 |

(Continued)

*Primary Examiner* — Jeffrey M Rutkowski
*Assistant Examiner* — Basil Ma
(74) *Attorney, Agent, or Firm* — Bayramoglu Law Offices LLC

(57) ABSTRACT

An intelligent bridge acceleration method and system based on a dual-communication device. By monitoring the online interactive application initiates a link at a household client-side, the data link is intercepted and the data packet is forwarded to the dual-communication device in the same LAN. WiFi is used as a primary path to perform data transmit-receive operations and a transmission quality monitoring mechanism is enabled. When an abnormal data transmit-receive through the WiFi is monitored via the transmission quality monitoring mechanism, a packet loss compensation strategy of a mobile data network is started; and the mobile data network is used as a secondary path for the data transmit-receive. When the data transmit-receive becomes normal, the data transmit-receive operations through the secondary path are stopped. Subsequently, the WiFi is continued to be used as the primary path to perform data transmit-receive operations, and the WiFi quality monitoring is continued to be performed.

15 Claims, 2 Drawing Sheets

(56) References Cited

U.S. PATENT DOCUMENTS

| | | | |
|---|---|---|---|
| 2010/0299433 A1* | 11/2010 | De Boer | H04L 47/14 |
| | | | 709/224 |
| 2015/0350954 A1* | 12/2015 | Faccin | H04W 28/12 |
| | | | 370/254 |
| 2017/0245190 A1* | 8/2017 | Katar | H04W 36/14 |

* cited by examiner

A. Before acceleration by the Xunyou accelerator

B. After acceleration by the Xunyou accelerator

INTELLIGENT BRIDGE ACCELERATION METHOD AND SYSTEM BASED ON DUAL-COMMUNICATION DEVICE

CROSS REFERENCE TO THE RELATED APPLICATIONS

This application is based upon and claims priority to Chinese Patent Application No. 201910107762.4, filed on Feb. 2, 2019, the entire contents of which are incorporated herein by reference.

TECHNICAL FIELD

The present invention relates to the technical field of communications, and particularly to an intelligent bridge acceleration method and system based on a dual-communication device.

BACKGROUND

With the continuous development and progress of Internet technology, online interactive applications have become one of the essential ways for learning, entertainment and even work for millions of users. According to incomplete statistics, in order to facilitate the learning and entertainment life at home, about 70% or more of users install the client-side in a household device that only works through a WiFi network. Since online interaction relies on network transmission, the WiFi network with a poor quality will directly affect the interaction effect of online applications. However, in practical applications, many users have been troubled with the situation that the online interaction cannot be successfully completed due to the poor WiFi network, which brings a poor experience to the users, and at the same time causes a great loss to the service providers. Therefore, how to achieve a stable and real-time network transmission becomes an urgent problem to be solved.

SUMMARY

The present invention provides an intelligent bridge acceleration method and system based on a dual-communication device, aiming at realizing a stable and real-time data transmission and preventing a transmission lagging problem caused by a poor WiFi quality.

The present invention provides an intelligent bridge acceleration method based on a dual-communication device. The intelligent bridge acceleration method based on the dual-communication device includes the following steps:
when monitoring that a client-side of an online interactive application at a household device initiates a link, intercepting a data link, and forwarding a data packet to the dual-communication device in a same local area network (LAN);
obtaining a target link based on the dual-communication device; using a WiFi as a primary path to perform a data transmit-receive operation; and meanwhile, enabling a WiFi transmission quality monitoring mechanism; and
when a transmit-receive of data through the WiFi is monitored to be abnormal by using the WiFi transmission quality monitoring mechanism, starting a packet loss compensation strategy of mobile data network, and using the mobile data network as a secondary path for the data transmit-receive operation; and when the transmit-receive of data through the WiFi is monitored to return to normal, stopping the data transmit-receive operation through the secondary path, continuing to use the WiFi as the primary path to perform the data transmit-receive operation, and continuing to perform a WiFi transmission quality monitoring.

Further, before forwarding the data packet to the dual-communication device in the same LAN, the method further includes:
monitoring and confirming that a data transmission mode between the dual-communication device and the household device running the client-side is normal;
wherein the data transmission mode includes: a WiFi transmission mode and a mobile data network transmission mode.

Further, enabling the WiFi transmission quality monitoring mechanism and continuing to perform the WiFi transmission quality monitoring include:
predicting a WiFi transmission quality based on a short-term transmission flow of a linear model, and performing a transmission flow abnormality monitoring on WiFi based on a prediction result of the short-term transmission flow.

Moreover, predicting the WiFi transmission quality based on the short-term transmission flow of the linear model includes:
assuming that n time units of historical data are lagged, a flow prediction model constructed using a time series model is as follows:

$$x_t = a_{t-1}x_{t-1} + a_{t-2}x_{t-2} + \ldots + a_{t-n}x_{t-n} + \varepsilon_t + b_{t-1}\varepsilon_{t-1} + b_{t-2}\varepsilon_{t-2} + \ldots + b_{t-m}\varepsilon_{t-m};$$

where, $x_t$ is a flow on a link at a time point of t, $x_{t-1}$ is a flow on the link at a time point of t−1, and so forth, $x_{t-n}$ is a flow on the link at a time point of t−n; $\varepsilon_n$ is a random perturbation, satisfying a normal distribution with a mean value of 0 and a standard deviation of σ; $\varepsilon_{t-1}, \varepsilon_{t-2}, \ldots, \varepsilon_{t-m}$ are random perturbations with a mean value of 0 and a variance of σ; and coefficients $a_t, a_{t-1}, a_{t-2}, \ldots, a_{t-n}, b_{t-1}, b_{t-2}, \ldots, b_{t-m}$ of the model are obtained by a maximum likelihood estimation method using the historical data;
using the constructed time series model to perform a link flow prediction h steps ahead;
using predicted data and the historical data to construct the following linear model:

$$y = X\beta + \epsilon;$$

in this model, y is a link flow value, variable X is (n+h−p+1)×p matrix, $\epsilon \in N(0, \sigma^2 I)$, β is p×1 vector, and $\beta = [\beta_0 \beta_1 \ldots \beta_{p-1}]$; when building the model, the historical data is obtained successively in a sliding window with a length of p; assuming that there are (n+h) data, then a total of (n+h−p+1) data segments are obtained using p as the sliding window;
the matrix X is actually the (n+h−p+1)×p matrix, then a least square method is used to obtain the following β vector:

$$\beta = (X^T X)^{-1} X^T y;$$

by using the β vector, an estimated value of y is calculated as follows:

$$\hat{y} = X\beta = X(X^T X)^{-1} X^T y = Hy; \text{ where, } H = X(X^T X)^{-1} X^T;$$

wherein, H matrix represents a projection matrix; defining $h_i = x_i^T (X^T X)^{-1} x_i$ as a leverage value of the $i^{th}$ data segment in the X matrix, and the larger the leverage value, the larger the data deviates from a normal range;
calculating a Cook's distance of a data segment at the time point of t as:

$$D_t = \frac{\sum_{j=1}^{n+h-p+1}(\hat{y}_j - \hat{y}_{-t})}{p[(n+h+1)^{-1}e^T e]^2};$$

wherein, $\hat{y}_{-t}$ represents a value of the model obtained after the data segment at the time point of t is removed, e is an average squared error vector of the model, and $e=y-\hat{y}=(I-H)y$; and $D_t$ can also be calculated by the following expression:

$$D_t = \frac{e_t^2}{[(n+h+1)^{-1}e^T e]^2}\left[\frac{h_t}{(1-h_t)^2}\right];$$

using the historical data in a predetermined period of time to determine a changing direction of the link flow;

when a probability of the abnormality of the WiFi link flow is identified to be greater than a preset threshold according to a numerical value of $D_t$ and the changing direction of the link flow, performing a switching preparation operation, that is, preparing a switching from a WiFi network link to a mobile data network link.

Further, forwarding the data packet to the dual-communication device in the same LAN includes:
  searching a history record, and selecting a corresponding dual-communication device according to the history record; and if there is no used dual-communication device in the history record, automatically matching and adding a dual-communication device for matching a current online interactive application.

Further, searching the history record, and selecting the corresponding dual-communication device according to the history record, includes:
  searching the history record, if there are used dual-communication devices in the history record, identifying a number of the used dual-communication devices;
  if there is only one used dual-communication device in the history record, directly selecting the one used dual-communication device;
  if there are multiple used dual-communication devices in the history record, displaying all of the multiple used dual-communication devices in the history record for users to select; and selecting a corresponding dual-communication device according to a selection instruction triggered by the users;
  or, selecting a dual-communication device with a highest priority by referring to a priority of all of the multiple used dual-communication devices in the history record;
  or, according to the historical record, determining qualities of mobile network communications corresponding to all the dual-communication devices in the history record, and selecting a dual-communication device with a best mobile network communication quality.

Further, enabling the WiFi transmission quality monitoring mechanism includes:
  using a transmission function $W_1(t)$ to represent a data transmission of a WiFi communication mode in the LAN; and using a transmission function $W_2(t)$ to represent a data transmission of a mobile data network in the same LAN;
  assuming that an input pulse function of dual path of WiFi transmission path and mobile data transmission path is $\delta(t)$; and calculating a difference between an output result $C_i(t)$ and a convolution result of the input pulse function $\delta(t)$ and the transmission functions $W_1(t)$ and $W_2(t)$ to obtain a consistency factor $\eta_i$:
  $\eta_i = C_i(t) - \int_{-\infty}^{+\infty}\delta(\tau)W_i(t-\tau)d\tau$; wherein, i=1 represents the WiFi communication mode, and i=2 represents the mobile data communication mode;
  if $\eta_i=0$, the two communication modes of WiFi and mobile data network are normal; and
  if $\eta_i \neq 0$, the two communication modes of WiFi and mobile data network are abnormal;
  when the communication modes are detected to be normal, denoting an acquired target link as M(t), monitoring the WiFi transmission quality in real time and recording the WiFi transmission quality as Z(t);
  comparing a monitored WiFi transmission quality Z(t) with a preset transmission quality threshold $Z_0$; wherein
  when Z(t) is greater than or equal to $Z_0$, the data transmit-receive through the WiFi transmission path is determined to be normal; and
  when Z(t) is smaller than $Z_0$, the data transmit-receive through the WiFi transmission path is determined to be abnormal.

Further, the intelligent bridge acceleration method based on the dual-communication device further includes the following steps:
  predetermining the data according to user's operating habits, and storing predetermined data as a pre-transmitted data;
  wherein, a target link M(t) at a current state is obtained, a conceptual tree model is established, and a similarity degree $S_i$ between a target link $M_i(t)$ of the $i^{th}$ subsequent operation situation that the user may have and the target link M(t) at the current state is calculated as follows:

$$S_i(M(t), M_i(t)) = \text{Weight}(B) = \frac{1}{a}\sum_{j=1}^{a} r_j^i;$$

wherein: $S_i(M(t), M_i(t))$ is a similarity degree between the target link $M_i(t)$ of the $i^{th}$ subsequent operation situation and the target link M(t) at the current state; Weight(B) is a best matching weight; a is a matching number of B; and $r_j^i$ is a weight corresponding to the $j^{th}$ matching parameter of the target link $M_i(t)$ of the $i^t$ subsequent operation situation and the target link M(t) at the current state; the value of $r_j^i$ is calculated as follows:

$$r_j^i = \begin{cases} 1, & (M(t) = M_i(t)) \\ e^{-\mu l} \times \frac{e^{\varepsilon h} - e^{-\varepsilon h}}{e^{\varepsilon h} + e^{-\varepsilon h}}, & (M(t) \neq M_i(t)) \end{cases};$$

wherein, l represents a shortest path length of M(t) and $M_i(t)$ in the conceptual tree; h represents a height of a same upper-layer concept closest to the M(t) and $M_i(t)$ in the conceptual tree; and $\mu$ and $\varepsilon$ are influence factors used to adjust l and h in the similarity degree calculation, and $\mu$ and $\varepsilon$ are greater than or equal to 0;

after the similarity degree is calculated, performing a normalization process to obtain a weight $U_i$ of the target link of the $i^{th}$ subsequent operation situation:

$$U_i = \frac{S_i(M(t), M_i(t))}{\sum_{i=1}^{n} S_i(M(t), M_i(t))};$$

wherein, n is the target link of n kinds of subsequent operation conditions that the user may have;

using a greedy algorithm, i.e., GreedyKnapsack (D, h, $U_i$, $P_i$, X), to obtain an i value under an optimal solution, thereby determining the user's next operation, and storing the predicted data to achieve the stability of the acceleration; wherein, D is a memory capacity, $P_i$ is a size of a memory occupied by the $i^{th}$ subsequent operation situation during use, and X is a number of data of the target link loaded into the memory.

Further, the intelligent bridge acceleration method based on the dual-communication device further includes the following steps:

gathering data sent from a dual-channel data transmission path based on the dual-communication device to a server-side of an intelligent network accelerator, and then forwarding the data to a target server by the server-side of the intelligent network accelerator;

wherein, the dual-channel data transmission path includes: a transmission path using the WiFi as a primary path for the data transmit-receive, and a transmission path using the mobile data network as a secondary path for the data transmit-receive;

Corresponding to the intelligent bridge acceleration method based on the dual-communication device provided above, the present invention also provides an intelligent bridge acceleration system based on a dual-communication device. The system includes a household device and a dual-communication device respectively installed with an intelligent network accelerator. The household device and the dual-communication device are located in a same local area network (LAN) and are connected to each other in a communication mode.

Moreover, the intelligent network accelerator is configured to intercept a data link, and forward a data packet to the dual-communication device in the same LAN, when a client-side of an online interactive application is monitored to initiate a link at the household device.

Based on the dual-communication device, the intelligent network accelerator obtains the target link, uses a WiFi as a primary path to perform a data transmit-receive operation, and enables a WiFi transmission quality monitoring mechanism.

When an abnormal data transmit-receive through the WiFi is monitored by the intelligent network accelerator using an enabled WiFi transmission quality monitoring mechanism, the dual-communication device starts a packet loss compensation strategy of a mobile data network, and uses the mobile data network as a secondary path for the data transmit-receive. When the intelligent network accelerator monitors that the data transmit-receive through the WiFi returns to normal, the dual-communication device stops the data transmit-receive operation through the secondary path; subsequently, the intelligent network accelerator continues to use the WiFi as the primary path to perform the data transmit-receive operation, and perform the WiFi transmission quality monitoring.

Further, a data transmission mode between the dual-communication device and a household device running a household client-side is normal.

Moreover, the data transmission mode includes: a WiFi transmission mode and a mobile data network transmission mode.

Further, the intelligent network accelerator enables the WiFi transmission quality monitoring mechanism, and continues to perform the WiFi quality monitoring, includes the following steps:

predicting a WiFi transmission quality based on a short-term transmission flow of a linear model, and performing a transmission flow abnormality monitoring on the WiFi based on a prediction result of the short-term transmission flow;

wherein, the predicting of the WiFi transmission quality based on the short-term transmission flow of the linear model includes:

assuming n time units of historical data are lagged, and a flow prediction model constructed using a time series model is as follows:

$$x_t = a_t x_{t-1} + a_{t-2} x_{t-2} + \ldots + a_{t-n} x_{t-n} + \varepsilon_t + b_{t-1} \varepsilon_{t-1} + b_{t-2} \varepsilon_{t-2} + \ldots + b_{t-m} \varepsilon_{t-m};$$

wherein, $x_t$ is a flow on a link at a time point of t, $x_{t-1}$ is a flow on the link at a time point of t−1, and so forth, $x_{t-n}$ is a flow on the link at a time point of t-n; $\varepsilon_n$ is a random perturbation, satisfying a normal distribution with a mean value of 0 and a standard deviation of σ; $\varepsilon_{t-1}, \varepsilon_{t-2}, \ldots, \varepsilon_{t-m}$ are random perturbations with a mean value of 0 and a variance of σ; and coefficients $\alpha_t, \alpha_{t-1}, \alpha_{t-2}, \ldots, \alpha_{t-n}, b_{t-1}, b_{t-2}, \ldots, b_{t-m}$ of the model are obtained by a maximum likelihood estimation method using the historical data;

using a constructed time series model to perform a link flow prediction h steps ahead;

using predicted data and the historical data to construct the following linear model simultaneously:

$$y = X\beta + \in;$$

wherein in this model, y is a link flow value, variable X is (n+h−p+1)×p matrix, $\in \in N(0, \sigma^2 I)$, β is p×1 vector, and $\beta = [\beta_0 \beta_1 \ldots \beta_{p-1}]$; when the model is constructed, the historical data are obtained successively in a sliding window with a length of p; assuming a number of data is (n+h), a total of (n+h−p+1) data segments are obtained using p as the sliding window;

the matrix X is actually a (n+h−p+1)×p matrix, then a least square method is used to obtain the following β vector:

$$\beta = (X^T X)^{-1} X^T y;$$

using the β vector to calculate an estimated value of y:

$$\hat{y} = X\beta = X(X^T X)^{-1} X^T y = Hy; \text{ wherein, } H = X(X^T X)^{-1} X^T;$$

wherein, H matrix represents a projection matrix; $h_i = x_i^T (X^T X) x_i$ is defined as a leverage value of the $i^{th}$ data segment in the X matrix; and the larger the leverage value, the larger the data deviates from a normal range;

calculating a Cook's distance of a data segment at the time point of t:

$$D_t = \frac{\sum_{j=1}^{n+h-p+1} (\hat{y}_j - \hat{y}_{-t})}{p[(n+h+1)^{-1} e^T e]^2};$$

wherein, $\hat{y}_{-t}$ represents a value of the model obtained after the data segment at the time point of t is removed, e is an average squared error vector of the model, and $e=y-\hat{y}=(I-H)y$; and $D_t$ can also be calculated by the following expression:

$$D_t = \frac{e_t^2}{[(n+h+1)^{-1}e^Te]^2}\left[\frac{h_t}{(1-h_t)^2}\right];$$

using the historical data in a predetermined period of time to determine a changing direction of a link flow;

when a probability of an abnormality of a WiFi link flow is identified to be greater than a preset threshold according to a numerical value of $D_t$ and the changing direction of the link flow, performing a switching preparation operation, that is, preparing to switch from a WiFi network link to a mobile data network link.

Further, the intelligent network accelerator enables the WiFi transmission quality monitoring mechanism includes:

using a transmission function $W_1(t)$ to represent a data transmission of the WiFi communication mode in the LAN; and using a transmission function $W_2(t)$ to represent data transmission of the mobile data network in the same LAN;

assuming an input pulse function of dual path of WiFi transmission path and mobile data transmission path as $\delta(t)$; and calculating a difference between an output result $C_i(t)$ and a convolution result of the input pulse function $\delta(t)$ and the transmission functions $W_1(t)$ and $W_2(t)$ to obtain a consistency factor $\eta_i$:

$\eta_i=C_i(t)-\int_{-\infty}^{+\infty}\delta(\tau)W_i(t-\tau)d\tau$; wherein, $i=1$ represents the WiFi communication mode, and $i=2$ represents the mobile data communication mode;

if $\eta_i=0$, the two communication modes of WiFi and mobile data network are normal; and if $\eta_i\neq 0$, the two communication modes of WiFi and mobile data network are abnormal;

when the communication modes are detected to be normal, denoting an acquired target link as M(t), monitoring the WiFi transmission quality in real time, and recording a monitored WiFi transmission quality as Z(t);

comparing the monitored WiFi transmission quality Z(t) with a preset transmission quality threshold $Z_0$; wherein when Z(t) is greater than or equal to $Z_0$, the data transmit-receive through the WiFi transmission path is determined to be normal; and when Z(t) is smaller than $Z_0$, the data transmit-receive through the WiFi transmission path is determined to be abnormal.

Further, the intelligent network accelerator gathers data sent from a dual-channel data transmission path based on the dual-communication device to a server-side of the intelligent network accelerator; and then the server-side of the accelerator forwards the data to a target server.

Moreover, the dual-channel data transmission path includes: a transmission path using the WiFi as a primary path for a data transmit-receive, and a transmission path using the mobile data network as a secondary path for a data transmit-receive.

The intelligent bridge acceleration method and system based on the dual-communication device of the present invention can achieve the following advantages:

By monitoring that the client-side of the online interactive application initiates a link at a household device, the data link is intercepted and, the data packet is forwarded to the dual-communication device in the same LAN. The target link is obtained based on the dual-communication device, the WiFi is used as a primary path to perform data transmit-receive operations; and at the same time, the WiFi transmission quality monitoring mechanism is enabled. When an abnormal data transmit-receive through the WiFi is monitored by using an enabled WiFi transmission quality monitoring mechanism, a packet loss compensation strategy of a mobile data network is started; and the mobile data network is used as a secondary path for the data transmit-receive. When the data transmit-receive through the WiFi is monitored to return to normal, the data transmit-receive operations through the secondary path is stopped; subsequently, the WiFi is continued to be used as the primary path to perform data transmit-receive operations, and the WiFi quality monitoring is continued to be performed. Therefore, the problem of the transmission lagging caused by poor quality of WiFi is solved, the stable and real-time data transmission is realized, and the data transmission quality is improved. For the user aspect, the user experience is improved; and for the service provider aspect, the loss brought by poor quality of WiFi is reduced.

Other features and advantages of the present invention will be illustrated in the following description. Moreover, parts of the advantages become apparent from the specification, or are known by implementing the present invention. The objectives and other advantages of the present invention may be realized and obtained by the contents indicated in the written description, the appended claims and the drawings.

The technical solutions of the present invention will be further described below along with the drawings and embodiments.

BRIEF DESCRIPTION OF THE DRAWINGS

The drawings are used to provide a further understanding of the present invention, and form a part of the specification. The drawings, along with the embodiments of the present invention, are used to explain the present invention, rather than constitute a limitation to the present invention. In the drawings.

DETAILED DESCRIPTION OF THE EMBODIMENTS

Preferred embodiments of the present invention will be described below with reference to the drawings. It should be understood that the preferred embodiments described herein are intended to illustrate and explain the present invention, rather than limit the present invention.

The present invention provides an intelligent bridge acceleration method and system based on a dual-communication device, aiming at realizing a stable and real-time data transmission, and preventing transmission lagging problems caused by poor WiFi quality. In the following embodiments of the present invention, the implementation process of the technical solution is described by only taking a specific application scenario of household as an example. Of course, the technical solution can also be applied to any suitable LAN scenario in addition to the specific scenario of household, which is not exhaustively described and repeated in the embodiments again.

In the specific application scenario of a household, for the household device installed with the online interactive application, when the client-side is turned on, the intelligent bridge acceleration method is introduced; the corresponding accelerator intercepts the data link and sends the data link to the mobile device (i.e., the "dual-communication device" described in the embodiments of the present invention) with both WiFi and mobile data network in the same LAN; and the data transmit-receive is performed by the accelerator using the dual-path intelligent algorithm to achieve a stable and real-time online interaction effect.

Figure 1:
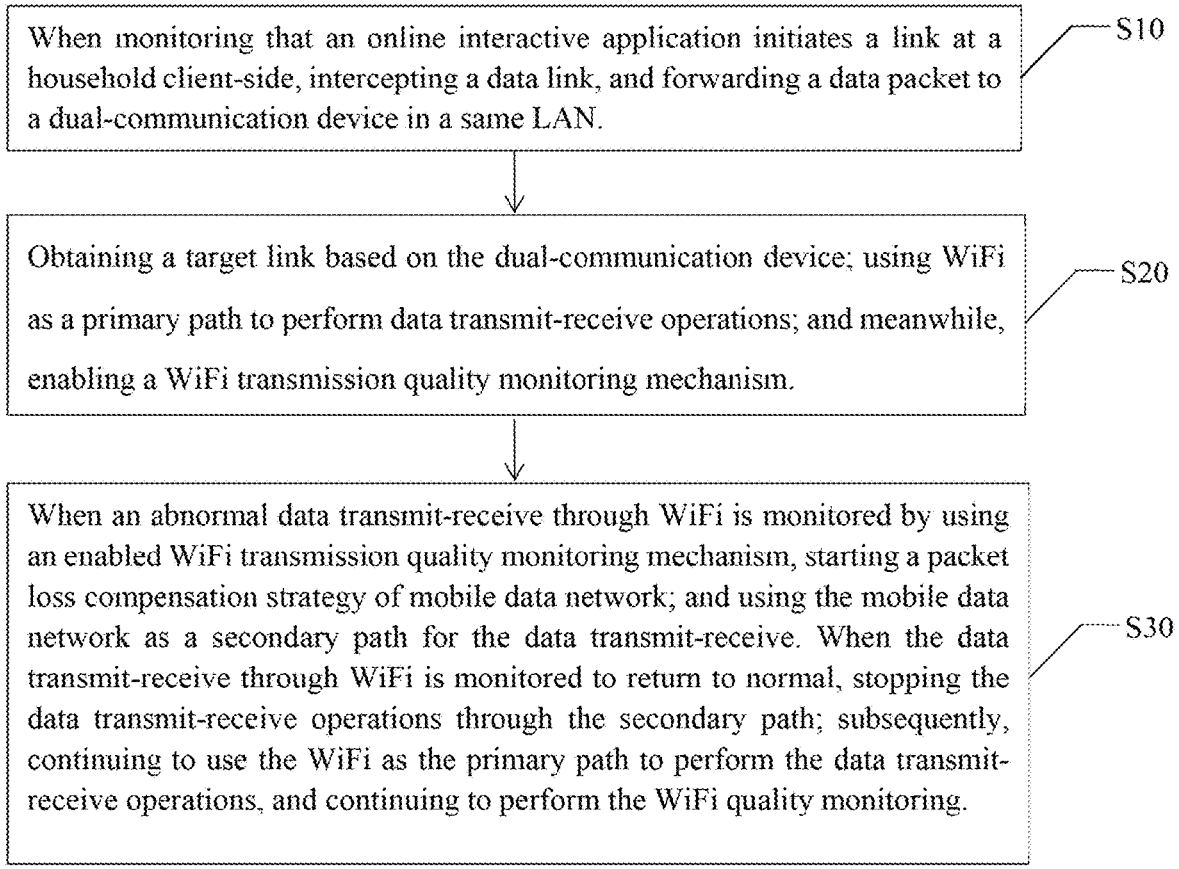
FIG. 1 is a process flow diagram of one implementation mode of an intelligent bridge acceleration method based on a dual-communication device of the present invention.

FIG. 1 is a process flow diagram of one implementation mode of an intelligent bridge acceleration method based on a dual-communication device of the present invention. As shown in FIG. 1, the intelligent bridge acceleration method based on the dual-communication device of the present invention can be implemented as steps S10-S30 described below.

Step S10, when monitoring that a client-side of an online interactive application initiates a link at a household device, a data link is intercepted, and a data packet is forwarded to the dual-communication device in a same LAN.

In the embodiment of the present invention, in the same home LAN, the dual-communication device is selected as a data forwarding node, and the intranet transmission between the household device and the data forwarding node, i.e., the dual-communication device, is ensured to be normal. When the online application is monitored to be opened on the household device by a user, the accelerator intercepts the target link, and forwards the data packet corresponding to the target link to one end of the dual-communication device through the intranet.

Step S20, a target link is obtained based on the dual-communication device; a WiFi is used as a primary path to perform a data transmit-receive operation; and meanwhile, a WiFi transmission quality monitoring mechanism is enabled.

Step S30, when an abnormal data transmit-receive through the WiFi is monitored by using an enabled WiFi transmission quality monitoring mechanism, a packet loss compensation strategy of a mobile data network is started; and the mobile data network is used as a secondary path for the data transmit-receive. When the data transmit-receive through the WiFi is monitored to return to normal, the data transmit-receive operation of the secondary path is stopped; subsequently, the WiFi is continued to be used as the primary path to perform the data transmit-receive operation, and the WiFi transmission quality monitoring is continued to be performed.

When the dual-communication device receives the data packet corresponding to the target link forwarded by the accelerator, the dual-path intelligent acceleration algorithm is used; in the one aspect, the WiFi path is used as the primary path, and the data is forwarded through the WiFi; and in the other aspect, the WiFi transmission quality monitoring mechanism is enabled to monitor the WiFi transmission quality. When an abnormal data transmit-receive through the WiFi is monitored, the packet loss compensation strategy of the mobile data network is started, and the mobile data network is used as the secondary path for the data transmit-receive to ensure the stability and real-time performance of the data transmission. When the data transmit-receive through the WiFi is monitored to return to normal, the data transmit-receive operations of the secondary path are stopped; subsequently, the WiFi is continued to be used as the primary path to perform the data transmit-receive operations, and the WiFi transmission quality monitoring is continued to be performed. The above steps S10-S30 are repeatedly executed until the target acceleration application stops running. In the embodiment of the present invention, the transmission manner of the mobile data network includes but is not limited to: 3G, 4G, and 5G mobile networks.

Further, in an embodiment of the present invention, before selecting the dual-communication device as the data forwarding node, officially starting the intelligent bridge acceleration method of the dual-communication device, and forwarding the data packet corresponding to the intercepted data link to the dual-communication device in the same LAN, it is necessary to monitor and confirm that the data transmission between a terminal of the dual-communication device and a household device running a household client-side is normal. The data transmission mode includes: a WiFi transmission mode and a mobile data network transmission mode.

Further, in an embodiment of the present invention, when performing the solution of the dual-path intelligent bridge acceleration of the dual-communication device, the pairing problem between the household client-side running the online interactive application and the dual-communication device is targeted. When the online interactive application is monitored to initiate the link at the household client-side, the data link is intercepted, and the data packet is forwarded to the dual-communication device in a same LAN. A historical pairing record can be searched, and a corresponding dual-communication device is selected according to the corresponding history pairing record.

Further, in the searched history record, if there are used dual-communication devices in the history record, the number of used dual-communication devices is identified. If there is only one dual-communication device that has been used in the history record, the dual-communication device that has been used is directly selected. If there are multiple dual-communication devices that have been used in the history record, a corresponding dual-communication device is selected according to a preset selection strategy. The preset selection strategies include, for example, in the case of multiple dual-communication devices that have been used in the history record, all of the dual-communication devices that have been used in the history record are displayed for the users to select, and then a corresponding dual-communication device is selected according to a selection instruction triggered by the users; or, a dual-communication device with a highest priority is selected by referring to the priority of all of the dual-communication devices that have been used in the history record; or, according to the history record, the mobile network communication qualities corresponding to all the dual-communication devices in the history record are determined, and a dual-communication device with a best mobile network communication quality is selected; or, according to the history record, dual-communication devices available currently in the history record are determined, and a dual-communication device is further selected from the dual-communication devices available currently. In the embodiment of the present invention, for the case where there are multiple dual-communication devices that have been used in the history record, the selection strategy of the dual-communication device may be set according to the specific application scenario and the corresponding hardware configuration. The embodiment of the present invention does not limit and enumerate the specific contents of the above selection strategies.

In the embodiment of the present invention, in the case that there is no used dual-communication device in the history record, the system automatically matches and adds a dual-communication device which is matched with the current online interactive application, so as to implement a dual-path intelligent acceleration solution based on the dual-communication device.

Further, in an embodiment of the present invention, for the data processing on the server side, the system gathers data sent from a dual-channel data transmission path based on the dual-communication device to the server-side of the intelligent network accelerator; and then the server-side of the intelligent accelerator forwards the data to the target server. The dual-channel data transmission path described in the embodiment of the present invention includes: a transmission path using the WiFi as the primary path for transmitting and receiving data, and a transmission path using the mobile data network as the secondary path for transmitting and receiving data.

Figure 2A:
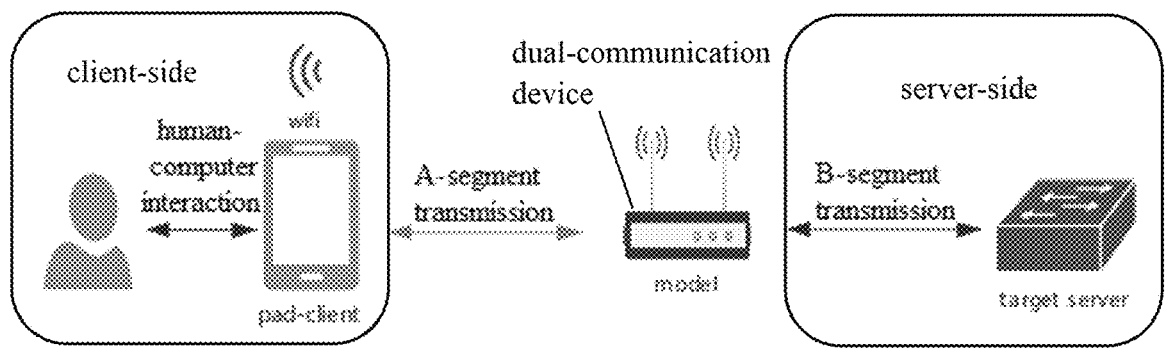
FIG. 2A is a topological diagram showing an application scenario (before acceleration by a Xunyou accelerator) of one implementation mode of an intelligent bridge acceleration method based on a dual-communication device of the present invention.
Figure 2B:
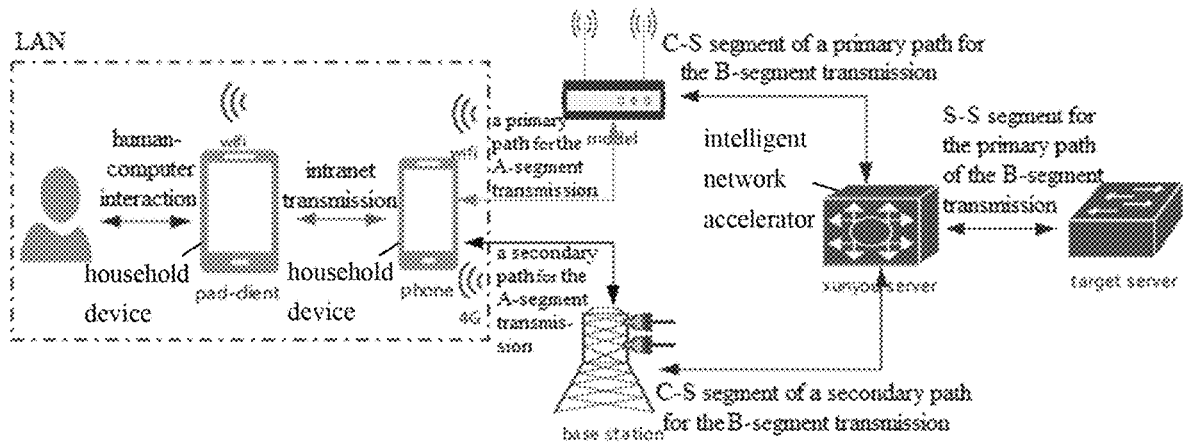
FIG. 2B is a topological diagram showing an application scenario (after acceleration by a Xunyou accelerator) of one implementation mode of an intelligent bridge acceleration method based on a dual-communication device of the present invention.

Based on the description of the embodiment corresponding to FIG. 1, in a specific application scenario, as shown in FIGS. 2A and 2B, FIGS. 2A and 2B are topological diagrams showing application scenarios of implementation modes of an intelligent bridge acceleration method based on a dual-communication device of the present invention. In the embodiment shown in FIGS. 2A and 2B, before the intelligent bridge acceleration method based on the dual-communication device of the present invention is adopted, the data transmission corresponding to the online application in the home LAN relies only on a single WiFi link. When the WiFi communication quality is not good, the transmission path of A-segment in FIG. 2A is affected, resulting in data interaction being affected. Therefore, the most intuitive feeling for the user-side is that the interaction is lagging. This situation not only has a great impact on the user experience, but also brings a certain degree of loss to the service operators. However, this situation cannot be completely avoided in the case of only relying on the WiFi transmission path.

In the embodiment corresponding to FIG. 2B, the corresponding accelerator is configured; an intelligent acceleration bridge is constructed by using "local area network, dual-communication device, and dual-path intelligent acceleration algorithm" method; the dual-communication device is selected as a data forwarding node in the same LAN; and the intranet transmission between the household device and the data forwarding node, i.e., the dual-communication device, is ensured to be normal. When the user starts the online application on the household device side, a Xunyou accelerator intercepts the target link, and forwards the link data to an end of the dual-communication device through the intranet, that is, the intranet transmission shown in FIG. 2B. When the dual-communication device side receives the link data corresponding to the target link forwarded by the accelerator, the dual-path intelligent acceleration algorithm is used; in the one aspect, the WiFi path is used as the primary path, and the data is forwarded through the WiFi (that is, the primary transmission path of the A-segment in FIG. 2B); and in the other aspect, the WiFi transmission quality is monitored, and when an abnormal data transmission through the WiFi is monitored, the packet loss compensation strategy of the mobile data network is started, and the mobile data network is used to ensure the stability and real-time performance of the data transmission (that is, the secondary transmission path of the A-segment in FIG. 2B). The data sent by the Xunyou accelerator from the dual-communication channel is gathered to a Xunyou server, and then the data is forwarded to the target server by the Xunyou server (that is, the C-S segment and S-S segment of the primary and secondary paths of the B-segment transmission shown in FIG. 2B).

In the embodiment of the present invention, the principle of the dual-path intelligent acceleration algorithm of the Xunyou accelerator is described as follows. First, the communication method between the WiFi and the mobile data network (such as 4G mobile network) of the dual-communication device is confirmed to be normal. After obtaining the target link, the WiFi is used as the primary path for data transmit-receive. The WiFi transmission quality monitoring mechanism is enabled. When monitoring the abnormal data transmit-receive through the WiFi, the mobile network (the secondary path) is enabled for data transmit-receive. When the WiFi quality returns to normal, the transmission of the secondary path is stopped, the data transmission is continued to be performed through the WiFi primary path, and the WiFi transmission quality monitoring is continued to be performed. The above processes are repeated until the target acceleration application stops.

According to the intelligent bridge acceleration method based on the dual-communication device of the present invention, when the online interactive application is monitored to initiate a link at a household client-side, the data link is intercepted, and the data packet is forwarded to the dual-communication device in the same LAN. The target link is obtained based on the dual-communication device, the WiFi is used as a primary path to perform data transmit-receive operations; and at the same time, the WiFi transmission quality monitoring mechanism is enabled. When abnormal data transmit-receive through the WiFi is monitored by using an enabled WiFi transmission quality monitoring mechanism, a packet loss compensation strategy of a mobile data network is started; and the mobile data network is used as a secondary path for the data transmit-receive. When the data transmit-receive through the WiFi is monitored to return to normal, the data transmit-receive operations of the secondary path are stopped; and subsequently, the WiFi is continue to be used as the primary path to perform data transmit-receive operations. Therefore, the problem of the transmission lagging caused by poor quality of WiFi is solved, the stable and real-time data transmission is realized, and the data transmission quality is improved. For the user side, the user experience is improved; and for the service provider side, the loss brought by the poor quality of WiFi is reduced.

Further, in the intelligent bridge acceleration method based on the dual-communication device, the key problem of the present invention is how to monitor the WiFi transmission quality. A sudden drop in transmission quality is usually accompanied by a sudden drop in transmission flow. The present invention provides a novel WiFi transmission quality monitoring algorithm. Through this algorithm, the transmission of WiFi can be predicted in a very short time, and the switching of the data link between the WiFi and the mobile data network can be prepared in advance, thereby improving the link switching efficiency, and making the link switching more stable and smoother. In one embodiment, the transmission quality monitoring algorithm provided by the present invention is divided into two parts. The first part is a short-term transmission flow prediction based on a linear model, and the second part is a flow abnormal monitoring. Moreover, the prediction results of the first part are used in the flow abnormal monitoring of the second part.

For the first part of transmission quality monitoring, a time series model is used in the short-term transmission flow prediction method. Assuming that n time units of historical data are lagged, a flow prediction model is constructed as follows:

$$x_t = a_t x_{t-1} + \alpha_{t-2} x_{t-2} + \ldots + \alpha_{t-n} x_{t-n} + \varepsilon_t + b_{t-1} \varepsilon_{t-1} + b_{t-2} \varepsilon_{t-2} + \ldots + b_{t-m} \varepsilon_{t-m};$$

in the above model, $x_t$ is a flow on a link at a time point of t, $x_{t-1}$ is a flow on the link at a time point of t−1, and so forth, $x_{t-n}$ is a flow on the link at a time point of t−n; $\varepsilon_n$ a random perturbation, satisfying a normal distribution with a mean value of 0 and a standard deviation of σ; $\varepsilon_{t-1}, \varepsilon_{t-2}, \ldots, \varepsilon_{t-m}$ are random perturbations with a mean value of 0 and a variance of σ; and coefficients $\alpha_t, \alpha_{t-1}, \alpha_{t-2}, \ldots, \alpha_{t-n}, b_{t-1}, b_{t-2}, \ldots, b_{t-m}$ of the model are obtained by a maximum likelihood estimation method using the historical data.

This model can be used to predict the flow h steps ahead. For example, in a specific application scenario, h is set as 5, that is, the flow is predicted 5 steps in advance. In general, abnormal monitoring of transmission quality only involves a very short time interval. If the time interval is very long, the abnormal monitoring of transmission quality becomes meaningless. In the present invention, the time interval of the abnormality monitoring can be set to 1 second, that is, the link flow data is collected once every second. The lag time of the historical data for predicting is 10 seconds, which means that only the flow data with a lag of 10 seconds is used for the link flow prediction. In actual implementation, the length of the time interval can be adjusted according to actual needs, so that the flow prediction of the system can reach an optimal level.

In the second part of the present invention, the flow abnormal monitoring is achieved by calculating a Cook's distance. Firstly, a flow prediction model is constructed according to the short-term flow prediction method of the first part, and then the existing flow data is used for the prediction in advance by h steps. In actual practice, it is necessary to define the unit of the time interval of flow data sampling for the prediction step length h. However, it is not always better to select a value of h as large as possible, of course, such parameter needs to be adjusted. In one embodiment of the present invention, h is set as 10. The predicted data and the historical data are used to construct the following linear model simultaneously:

$$y = X\beta + \varepsilon.$$

in this model, y is a link flow value, variable X is (n+h−p+1)×p matrix, $\varepsilon \in N(0, \sigma^2 I)$, β is p×1, vector, and $\beta = [\beta_0 \beta_1 \ldots \beta_{p-1}]$.

When the model is constructed, the historical data are obtained successively in a sliding window with a length of p. The number of data is assumed to be (n+h), then a total of (n+h−p+1) data segments are obtained using p as the sliding window.

For example, when n=5, h=1, and p=2, a total of 5 data segments can be obtained, and each data segment includes 2 data values. Then, the matrix X is actually a (n+h−p+1)×p matrix, and the least square method is used to obtain the following β vector:

$$\beta = (X^T X)^{-1} X^T y;$$

by using the β vector, an estimated value of y is calculated as follows:

$$\hat{y} = X\beta = X(X^T X)^{-1} X^T y = Hy;\ \text{wherein},\ H = X(X^T X)^{-1} X^T;$$

wherein, H matrix represents a projection matrix, also known as a hat matrix. $h_i = x_i^T (X^T X) x_i$ is defined as a leverage value of the $i^{th}$ data segment (i.e., the $i^{th}$ row of the matrix) in the X matrix. The larger the leverage value, the larger the data deviates from a normal range. Since there are n historical data and h predicted data, the main goal is to perform abnormal monitoring on the data segments composed of the h predicted data.

The monitoring method of the present invention is to calculate the distance value of the data segment, specifically, calculate the Cook's distance of the data segment at the time point of t as follows:

$$D_t = \frac{\sum_{j=1}^{n+h-p+1} (\hat{y}_j - \hat{y}_{-t})}{p[(n+h+1)^{-1} e^T e]^2};$$

wherein, $\hat{y}_{-t}$ represents a value of the model obtained after the data segment at the time point of t is removed, e is an average squared error vector of the model, and $e = y - \hat{y} = (1-H)y$. Then $D_t$ actually represents a distance calculated after removing the $t^{th}$ data segment. The larger the value, the greater the probability that the data segment is an abnormal data segment. Generally, this value is compared with 1, when it is greater than 1, it means that the data segment includes abnormal data. That is, the WiFi link flow has a large probability of abnormality, and the link needs to be switched. $D_t$ can also be calculated by the following expression:

$$D_t = \frac{e_t^2}{[(n+h+1)^{-1} e^T e]^2} \left[ \frac{h_t}{(1-h_t)^2} \right].$$

Simply calculating the distance value $D_t$ is not sufficient to determine whether there is a problem with the link, because a sudden increase in flow data will also increase the value of $D_t$. To this end, it is necessary to further determine the changing direction of the link flow, that is, the link flow is increased or decreased. Therefore, through learning, a model for determining the changing direction of the link flow is obtained by using the historical data in a predetermined period of time. This model is a probability model. Specifically, the flow value sequence is obtained by sampling from the historical flow data at a certain interval, it is assumed that the next flow change is only related to the previous flow value, and the probability transfer is similar to the Markov model, but has some differences.

Three variables are given to describe the flow-changing model. The first variable is A, indicating whether there is a flow change; the second variable is D, indicating the changing direction of flow; and the third variable is V, indicating the value of the flow. When the flow changes, A=1, if no flow change occurs, A=0. When the flow rate is increased, D=1, and when the flow rate is decreased, D=−1. Then, at a specific time point t, the value of the flow change is $y_t = A_t D_t V_t$. Assuming that the flow change process is a first-order Markov process, the probability that $y_t$ can be calculated is only related to the information $F_{t-1}$ obtained at a time point of (t−1), that is:

$$P(y_t|F_{t-1}) = P(A_t D_t V_t | F_{t-1});$$

expanding $P(y_t|F_{t-1}) = P(A_t D_t V_t | F_{t-1})$ to obtain:

$$P(y_t|F_{t-1}) = P(A_t D_t V_t | F_{t-1}) = P(A_t|F_{t-1}) P(D_t|A_t, F_{t-1}) P(V_t|A_t, D_t, F_{t-1});$$

therefore, the calculation of $P(y_t|F_{t-1})$ is decomposed into three parts, namely, $P(A_t|F_{t-1})$, $P(D_t|A_t, F_{t-1})$ and $P(V_t|A_t, D_t, F_{t-1})$. Hereinafter are the methods for calculating the three probabilities, respectively. $F_{t-1}$ represents the sum of the existing information that one time unit is lagged. In this method, $F_{t-1}$ is actually the change direction and the change quantity of the link flow at the time point of t−1.

$y_t = P(A_t|F_{t-1})$ is defined, and the corresponding logit function is $$\text{logit}(y) = \ln\left(\frac{y_t}{1 - y_t}\right);$$

assuming that this function satisfies the linear relationship:

$$\text{logit}(y_t) = \ln\left(\frac{y_t}{1 - y_t}\right) = \beta_0 + \beta_1 A_{t-1};$$

then, parameters $\beta_0$ and $\beta_1$ can be obtained by logistic regression fitting. So, $P(A_t)$, is solved to be:

$$P(A_t|F_{t-1}) = \frac{e^{\beta_0 + \beta_1 A_{t-1}}}{1 + e^{\beta_0 + \beta_1 A_{t-1}}}.$$

Because the link flow either changes or does not change, $x_t = P(D_t = 1 | A_t = 1, F_{t-1})$ is defined, and then the corresponding logit function is:

$$\text{logit}(y) = \ln\left(\frac{x_t}{1 - x_t}\right);$$

assuming that this function satisfies the linear relationship:

$$\text{logit}(x_t) = \ln\left(\frac{x_t}{1 - x_t}\right) = \alpha_0 + \alpha_1 D_{t-1};$$

then, parameters $\alpha_0$ and $\alpha_1$ can be obtained by logistic regression fitting. So, $P(D_t|A_{t-1}, F_{t-1})$ is solved to be:

$$P(D_t|A_{t-1}, F_{t-1}) = \frac{e^{\alpha_0 + \alpha_1 D_{t-1}}}{1 + e^{\alpha_0 + \alpha_1 D_{t-1}}};$$

because the link flow either changes or does not change, The probabilities of $P(D_t = 0 | A_t = 0, F_{t-1})$ and $P(D_t = 1 | A_t 0, F_{t-1})$ are defined to be identically equal to 0, because if there is no flow change, there is no direction change.

A method for solving $P(V_t|A_t, D_t, F_{t-1})$ is given below. When $D_t = -1$, $P(V_t|A_t, D_t, F_{t-1})$ is defined as:

$$P(V_t | A_t, D_t, F_{t-1}) = \frac{1}{\sqrt{2\pi}\,\sigma} e^{\frac{(A_t D_t V_t - A_{t-1} D_{t-1} V_{t-1})^2}{\mu + 2\sigma^2}};$$

wherein, μ is the mean value of the link flow; σ is the standard deviation of the link flow over a time interval; $A_{t-1}$ indicates whether the link flow at the time point of t−1 changes; $D_{t-1}$ indicates the changing direction of the flow at the time point of t−1; $V_{t-1}$ indicates the link flow value at the time point of t−1; $A_t$ indicates whether the link flow at the time point of t changes; $D_t$ indicates the changing direction of the flow at the time point of t; and $V_t$ indicates the link flow value at the time point of t. The three parts of $P(A_t|F_{t-1})$, $P(D_t|A_t, F_{t-1})$ and $P(V_t|A_t, D_t, F_{t-1})$ are solved, respectively, and finally the $P(y_t|F_{t-1})$ is obtained as follows:

$$P(y_t | F_{t-1}) =$$
$$P(A_t D_t V_t | F_{t-1}) = P(A_t | F_{t-1}) P(D_t | A_t, F_{t-1}) P(V_t | A_t, D_t, F_{t-1}) =$$
$$\frac{e^{\beta_0 + \beta_1 A_{t-1}}}{1 + e^{\beta_0 + \beta_1 A_{t-1}}} \cdot \frac{e^{\alpha_0 + \alpha_1 D_{t-1}}}{1 + e^{\alpha_0 + \alpha_1 D_{t-1}}} \cdot \frac{1}{\sqrt{2\pi}\,\sigma} e^{\frac{(A_t D_t V_t - A_{t-1} D_{t-1} V_{t-1})^2}{\mu + 2\sigma^2}}.$$

In the embodiment of the present invention, when $D_t = 1$, it indicates that the flow increases, then the probability of abnormal link flow is relatively low; and when $D_t = -1$, it indicates that the flow is decreased, then the probability of abnormal link flow is relatively high.

Combining the calculations of distance and probability, the formula for calculating the link flow abnormal value that determines whether the link is abnormal at the time point of t can be expressed as:

$$S_t = D_t \times P(A_t D_t V_t | F_{t-1});$$

wherein, $D_t$ is the Cook's distance of the link flow data segment at the time point of t, and $P(A_t D_t V_t | F_{t-1})$ is the probability of change of the link flow at the time point of t.

The flow abnormal values $S_1$, $S_2$, $S_3$, $S_4$, and $S_5$ which are five steps advanced are calculated, and the average value $$S = \frac{s_1 + s_2 + s_3 + s_4 + s_5}{5}$$

is calculated. When $S > \delta$, it indicates that the probability of abnormal WiFi link flow is very high, and the link switching needs to be prepared in time. In practice, the parameter 6 needs to be determined according to the actual situation, such as δ=0.2. When the application is running, and the calculated probability of abnormal WiFi link flow is high, the system is ready to switch quickly from the WiFi network link to the mobile data network link.

In the WiFi transmission quality monitoring method described in the embodiment of the present invention, a linear model is used to predict the link flow, and a logistic regression method is used to calculate the change probability of the link flow, which are convenient to implement. Moreover, in the implementation method, the sliding window method is used to quickly process data, so that when a data transmission abnormality occurs, the switching from the data link of WiFi network to the data link of mobile data network can be prepared in advance, thereby increasing the efficiency and response speed, and improving the user experience.

Further, in the intelligent bridge acceleration method based on the dual-communication device, enabling the WiFi transmission quality monitoring mechanism to determine whether the data transmit-receive through the WiFi transmission path is normal can be implemented as follows.

A transmission function $W_1(t)$ is used to represent the data transmission through the WiFi communication mode in the LAN; and a transmission function $W_2(t)$ is used to represent the data transmission through the mobile data network in the same LAN.

An input pulse function of dual path of WiFi transmission path and mobile data transmission path is assumed as $\delta(t)$; and a difference between an output result $C_i(t)$ and a convolution result of the input pulse function $\delta(t)$ and the transmission functions $W_1(t)$ and $W_2(t)$ is calculated to obtain a consistency factor $\eta_i$; wherein, i=1 represents the WiFi communication mode, and i=2 represents the mobile data communication mode;

if $\eta_i=0$, the two communication modes of WiFi and mobile data network are normal; and if $\eta_i \neq 0$, the two communication modes of WiFi and mobile data network are abnormal.

When the communication modes are detected to be normal, an acquired target link is denoted as M(t), the WiFi transmission quality is monitored in real time and is recorded as Z(t).

A monitored WiFi transmission quality Z(t) is compared with a preset transmission quality threshold $Z_0$.

When Z(t) is greater than or equal to $Z_0$, the data transmit-receive through the WiFi transmission path is determined to be normal; and when Z(t) is smaller than $Z_0$, the data transmit-receive through the WiFi transmission path is determined to be abnormal.

Further, in an embodiment, using the intelligent bridge acceleration method based on the dual-communication device of the present invention, the data is predetermined according to the user's operating habits, and the predetermined data is stored as the pre-transmitted data.

Specifically, the target link M(t) at the current state is obtained, a conceptual tree model is established, and a similarity degree $S_i$ between a target link $M_i(t)$ of the $i^{th}$ subsequent operation situation that the user may have and the target link M(t) at the current state is calculated as follows:

$$S_i(M(t), M_i(t)) = \text{Weight}(B) = \frac{1}{a}\sum_{j=1}^{a} r_j^i;$$

wherein: $S_i(M(t), M_i(t))$ is a similarity degree between the target link $M_i(t)$ of the $i^{th}$ subsequent operation situation and the target link M(t) at the current state; Weight(B) is a best matching weight; a is a matching number of B; and $r_j^i$ is a weight of the target link $M_i(t)$ of the $i^{th}$ subsequent operation situation corresponding to the $j^{th}$ matching parameter of the target link M(t) at the current state. The value of $r_j^i$ is calculated as follows:

$$r_j^i = \begin{cases} 1, & (M(t) = M_i(t)) \\ e^{-\mu l} \times \frac{e^{\varepsilon h} - e^{-\varepsilon h}}{e^{\varepsilon h} + e^{-\varepsilon h}}, & (M(t) \neq M_i(t)) \end{cases};$$

wherein, l represents a shortest path length of M(t) and $M_i(t)$ in the conceptual tree; h represents a height of a same upper-layer concept closest to the M(t) and $M_i(t)$ in the conceptual tree; and μ and ε are influence factors used to adjust l and h in the similarity calculation, and μ and ε are greater than or equal to 0.

After the similarity degree is calculated, a normalization process is performed to obtain a weight $U_i$ of the target link of the $i^{th}$ subsequent operation situation:

$$U_i = \frac{S_i(M(t), M_i(t))}{\sum_{i=1}^{n} S_i(M(t), M_i(t))};$$

wherein, n is the target link of n kinds of subsequent operation conditions that the user may have.

The greedy algorithm, i.e., GreedyKnapsack (D, h, $U_i$, $P_i$, X), is used to obtain the i value under an optimal solution, thereby determining the user's next operation, and the predicted data is stored to achieve the stability of the acceleration; wherein, D is a memory capacity, $P_i$ is a size of a memory occupied by the $i^{th}$ subsequent operation situation during use, and X is a number of data of the target link loaded into the memory.

In a specific application scenario, for the WiFi and mobile communication modes such as 4G communication mode, it can be represented by two transmission functions. Namely, the transmission function $W_1(t)$ is used to represent the data transmission through the WiFi communication mode in the LAN, and the transmission function $W_2(t)$ is used to represent the data transmission through the mobile data network in the same LAN. First, it is determined that there is no abnormality in the two communication modes of WiFi and mobile communication, and the input pulse function $\delta(t)$ is introduced to the dual path. The input pulse function of dual path of WiFi transmission path and mobile data transmission path is assumed as $\delta(t)$; and a difference between an output result $C_i(t)$ and a convolution result of the input pulse function $\delta(t)$ and the transmission functions $W_1(t)$ and $W_2(t)$ is calculated to obtain a consistency factor $\eta_i$:

$\eta_i = C_i(t) - \int_{-\infty}^{+\infty} \delta(\tau) W_i(t-\tau) d\tau$; wherein, i=1 represents the WiFi communication mode, and i=2 represents the mobile data communication mode.

When $\eta_i=0$, the two communication modes of WiFi and mobile data network are normal; and when the two communication modes of WiFi and mobile data network are abnormal.

When the communication modes are detected to be normal, the acquired target link is denoted as M(t), and the WiFi transmission quality is monitored in real time and is recorded as Z(t). A judgment threshold of the transmission quality, i.e., a preset transmission quality threshold $Z_0$, is set. A monitored WiFi transmission quality Z(t) is compared with the preset transmission quality threshold $Z_0$. When Z(t) is greater than or equal to $Z_0$, the data transmit-receive through the WiFi transmission path is determined to be normal; and when Z(t) is smaller than $Z_0$, the data transmit-receive through the WiFi transmission path is determined to be abnormal. According to this feature, the unit step function ε(a), i.e., when a≥0, ϑ(a)=1, when a<0, ε(a)=0, can be used to determine the above problems. In an abnormal situation, the mobile network (secondary path) is started for data transmit-receive; and when the quality is improved, the mobile network is converted into WiFi for the data transmit-receive. Then, according to the above conditions, the expression of a signal Y(t) received by the terminal is as follows:

$$Y(t)=\text{conv}(\delta(\tau),(W_1(t-\tau)\varepsilon(Z(t)-Z_0)+W_2(t-\tau)\varepsilon(Z_0-Z(t))));$$

wherein, conv represents a convolution. In contrast, the expression of a signal $Y_0(t)$ received by the traditional terminal is as follows:

$$Y_0(t)=\text{conv}(\delta(\tau),W_1(t-\tau)\varepsilon(Z(t)-Z_0));$$

By comparison, it can be seen that $Y(t)-Y_0(t)\gg 0$, i.e., $Y(t)-Y_0(t)$ is far greater than 0, thus reflecting the rapidity and reliability of the Xunyou accelerator. For the data transmission, the signal will attenuate with the transmission distance, that is, the transmission function will change with the length of the distance. The attenuation function Los of the signal is as follows:

$$Los=32.44+20lgd+20lgf;$$

wherein, Los is the propagation loss with a unit of dB; d is the distance with a unit of Km; f is the operating frequency with a unit of MHz.

Considering the attenuation factor, a repair function δ(Los) can be added to the attenuation of the signal on the basis of dual communication to combine with the transmission function, and the expression of the final signal Yz received by the terminal is as follows:

$$Y_z=\text{conv}(\delta(\tau),((W_1(t-\tau)+\delta(Los))\varepsilon(Z(t)-Z_0)+(W_2(t-\tau)+\delta(Los))\varepsilon(Z_0-Z(t))));$$

so that the repair effect on the attenuation of the signal is achieved.

Further, in order to enable users to have a better and faster experience, the predetermining may be performed according to the user's operating habits, and the predetermined data is stored as the pre-transmitted data.

The specific operation is as follows. The target link M(t) is obtained, then the target links of n kinds of subsequent operation situations that the user may have are counted. The memory capacity is D, the similarity degree $X_i$ of the target link $M_i(t)$ of the $i^{th}$ subsequent operation situation and the target link at the current state, and the size $P_i$ of the memory occupied by the $i^{th}$ subsequent situation during use. Then the weight $U_i$ of the $i^{th}$ subsequent situation is determined according to the similarity degree; and the greedy algorithm is used to predict the user's next operation, so as to achieve the smooth use.

To calculate the similarity degree, the conceptual tree model established according to KM algorithm can be used. First, a best matching weight B of the target link $M_i(t)$ of the $i^{th}$ subsequent operation situation and the target link M(t) at the current state is obtained; and the best matching weight B is a similarity degree between the two target links. So:

$$S_i(M(t), M_i(t)) = \text{Weight}(B) = \frac{1}{a}\sum_{j=1}^{a} r_j^i;$$

wherein: $S_i(M(t), M_i(t))$ is the similarity degree between the target link $M_i(t)$ of the $i^{th}$ subsequent operation situation and the target link M(t) at the current state; Weight(B) is the best matching weight; a is a matching number of B; and $r_j^i$ is a weight of the target link $M_i(t)$ of the $i^t$ subsequent operation situation corresponding to the $j^{th}$ matching parameter of the target link M(t) at the current state. The value of $r_j^i$ is calculated as follows:

$$r_j^i = \begin{cases} 1, & (M(t) = M_i(t)) \\ e^{-\mu l} \times \frac{e^{\varepsilon h} - e^{-\varepsilon h}}{e^{\varepsilon h} + e^{-\varepsilon h}}, & (M(t) \neq M_i(t)) \end{cases};$$

wherein, l represents a shortest path length of M(t) and $M_i(t)$ in the conceptual tree; h represents a height of a same upper-layer concept closest to the M(t) and $M_i(t)$ in the conceptual tree; and μ and ε are influence factors used to adjust l and h in the similarity degree calculation, and μ and ε are greater than or equal to 0.

After the similarity degree is calculated, a normalization process is performed to obtain a weight $U_i$ of the target link of the $i^{th}$ subsequent operation situation:

$$U_i = \frac{S_i(M(t), M_i(t))}{\sum_{i=1}^{n} S_i(M(t), M_i(t))};$$

wherein, D is the memory capacity, $P_i$ is the size of the memory occupied by the $i^{th}$ subsequent operation situation during use, X is a number of data of the target link loaded into the memory, and n is the target link of n kinds of subsequent operation conditions that the user may have.

Then, the greedy algorithm, i.e., GreedyKnapsack (D, h, $U_i$, $P_i$, X), is used to obtain the i value under an optimal solution, thereby determining the user's next operation to achieve the stability of the acceleration.

Figure 3:
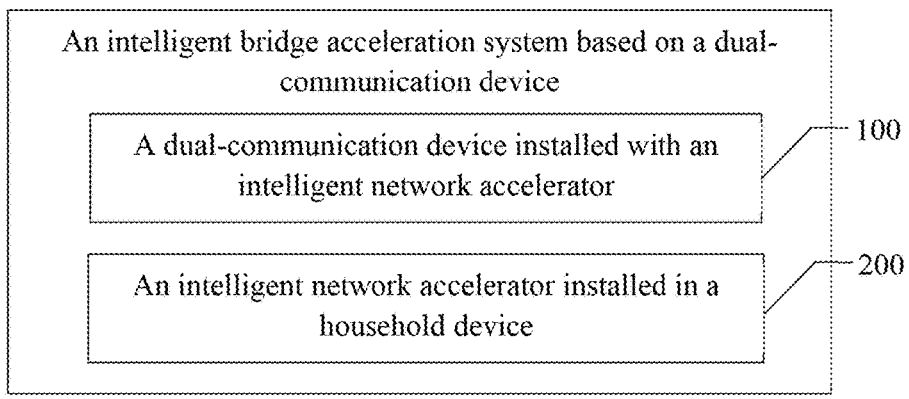
FIG. 3 is a schematic diagram showing functional modules of one implementation mode of an intelligent bridge acceleration system based on a dual-communication device of the present invention.

Based on the descriptions of the embodiments shown in FIGS. 1 and 2, as shown in FIG. 3, FIG. 3 is a schematic diagram showing functional modules of one implementation mode of an intelligent bridge acceleration system based on a dual-communication device of the present invention. The intelligent bridge acceleration system based on the dual-communication device of the present invention includes the dual-communication device 100 installed with an intelligent network accelerator and the intelligent network accelerator 200 installed in a household device. The dual-communication device 100 and the intelligent network accelerator 200 installed in the household device are located in the same LAN, and are connected to each other in a communication mode. The intelligent network accelerator 200 described in the embodiments of the present invention is an intelligent network accelerator arranged in a household device.

The intelligent network accelerator 200 is configured to intercept a data link, and forward a data packet to the dual-communication device 100 in a same LAN, when an online interactive application is monitored to initiate a link at a household client-side.

Based on the dual-communication device 100, the intelligent network accelerator 200 obtains a target link, a WiFi is used as a primary path to perform data transmit-receive operations, and a WiFi transmission quality monitoring mechanism is enabled.

When an abnormal data transmit-receive through WiFi is monitored by the intelligent network accelerator 200 using an enabled WiFi transmission quality monitoring mechanism, the dual-communication device 100 starts a packet loss compensation strategy of a mobile data network, and the mobile data network is used as a secondary path for the data transmit-receive. When the intelligent network accelerator 200 monitors that the data transmit-receive through the WiFi returns to normal, the dual-communication device 100 stops the data transmit-receive operations through the secondary path; subsequently, the intelligent network accelerator 200 continues to use the WiFi as the primary path to perform the data transmit-receive operations.

Further, in an embodiment, the data transmission mode between the dual-communication device 100 and a household device running a household client-side is normal.

Specifically, the data transmission mode includes: a WiFi transmission mode and a mobile data network transmission mode.

Further, in an embodiment, the intelligent network accelerator 200 gathers data sent from a dual-channel data transmission path based on the dual-communication device 100 to a server-side of the intelligent network accelerator 200; and then the server-side of the intelligent network accelerator 200 forwards the data to a target server.

Specifically, the dual-channel data transmission path includes: a transmission path using the WiFi as a primary path for transmitting and receiving data, and a transmission path using the mobile data network as a secondary path for transmitting and receiving data.

Further, in an embodiment, the intelligent network accelerator 200 enables the WiFi transmission quality monitoring mechanism, and continues to perform the WiFi transmission quality monitoring, including the following steps:

predicting a WiFi transmission quality based on a short-term transmission flow of a linear model, and performing a flow abnormal monitoring on the WiFi based on a prediction result of the short-term transmission flow;

wherein, predicting the WiFi transmission quality based on the short-term transmission flow of the linear model includes:

assuming n time units of historical data are lagged, a flow prediction model constructed using a time series model is as follows:

$$x_t = a_t x_{t-1} + \alpha_{t-2} x_{t-2} + \ldots + \alpha_{t-n} x_{t-n} + \varepsilon_t + b_{t-1}\varepsilon_{t-1} + b_{t-2}\varepsilon_{t-2} + \ldots + b_{t-m}\varepsilon_{t-m};$$

wherein, $x_t$ is a flow on a link at a time point of t, $x_{t-1}$ is a flow on the link at a time point of t−1, and so forth, $x_{t-n}$ is a flow on the link at a time point of t−n; $\varepsilon_n$ is a random perturbation, satisfying a normal distribution with a mean value of 0 and a standard deviation of σ; $\varepsilon_{t-1}, \varepsilon_{t-2}, \ldots, \varepsilon_{t-m}$ are random perturbations with a mean value of 0 and a variance of σ; and coefficients $\alpha_t, \alpha_{t-1}, \alpha_{t-2}, \ldots, \alpha_{t-n}, b_{t-1}, b_{t-2}, \ldots, b_{t-m}$ of the model are obtained by a maximum likelihood estimation method using the historical data.

The constructed time series model is used to perform the link flow prediction h steps ahead.

Predicted data and the historical data are used to construct the following linear model simultaneously:

$$y = X\beta + \epsilon;$$

in this model, y is a link flow value, variable X is (n+h−p+1)×p matrix, $\epsilon \in N(0,\sigma^2 I)$, β is p×1 vector, and $\beta = [\beta_0 \beta_1 \ldots \beta_{p-1}]$. When the model is constructed, the historical data are obtained successively in a sliding window with a length of p. The number of the data is assumed to be (n+h), then a total of (n+h−p+1) data segments are obtained using p as the sliding window.

The matrix X is actually a (n+h−p+1)×p matrix, and the least square method is used to obtain the following β vector:

$$\beta = (X^T X)^{-1} X^T y;$$

by using the β vector, an estimated value of y is calculated as follows:

$$\hat{y} = X\beta = X(X^T X)^{-1} X^T y = Hy; \text{ wherein, } H = X(X^T X)^{-1} X^T;$$

wherein, H matrix represents a projection matrix. $h_1 = x_i^T (X^T X) x_i$ is defined as a leverage value of the $i^{th}$ data segment in the X matrix. The larger the leverage value, the larger the data deviates from a normal range.

A Cook's distance of the data segment at the time point of t is calculated as:

$$D_t = \frac{\sum_{j=1}^{n+h-p+1}(\hat{y}_j - \hat{y}_{-t})}{p[(n+h+1)^{-1}e^T e]^2};$$

wherein, $\hat{y}_{-t}$ represents a value of the model obtained after the data segment at the time point of t is removed, e is an average squared error vector of the model, and $e = y - \hat{y} = (I - H)y$; and $D_t$ can also be calculated by the following expression:

$$D_t = \frac{e_t^2}{[(n+h+1)^{-1}e^T e]^2}\left[\frac{h_t}{(1-h_t)^2}\right].$$

The historical data in a predetermined period of time is used to determine a changing direction of the link flow.

When a probability of the abnormality of the WiFi link flow is identified to be greater than a preset threshold according to the numerical value of $D_t$ and the changing direction of the link flow, a switching preparation operation is performed, that is, a switching from the WiFi network link to the mobile data network link is prepared.

Further, in an embodiment, the intelligent network accelerator 200 enabling the WiFi transmission quality monitoring mechanism includes the following steps:

A transmission function $W_1(t)$ is used to represent the data transmission of the WiFi communication mode in the LAN; and a transmission function $W_2(t)$ is used to represent the data transmission of the mobile data network in the same LAN.

An input pulse function of dual path of the WiFi transmission path and mobile data transmission path is assumed as δ(t); and a difference between an output result $C_i(t)$ and a convolution result of the input pulse function δ(t) and the transmission functions $W_1(t)$ and $W_2(t)$ is calculated to obtain a consistency factor $\eta_i$:

$$\eta_i = C_i(t) - \int_{-\infty}^{+\infty} \delta(\tau) W_i(t-\tau) d\tau;$$ wherein, i=1 represents the WiFi communication mode, and i=2 represents the mobile data communication mode;

if $\eta_i = 0$, the two communication modes of WiFi and mobile data network are normal; and if $\eta_i \neq 0$, the two communication modes of WiFi and mobile data network are abnormal.

When the communication modes are detected to be normal, an acquired target link is denoted as M(t), and the WiFi transmission quality is monitored in real time and is recorded as Z(t).

A monitored WiFi transmission quality Z(t) is compared with a preset transmission quality threshold $Z_0$.

When Z(t) is greater than or equal to $Z_0$, the data transmit-receive through the WiFi transmission path is determined to be normal; and when Z(t) is smaller than $Z_0$, the data transmit-receive through the WiFi transmission path is determined to be abnormal.

Further, in an embodiment, the intelligent network accelerator 200 predetermines the data according to user's operating habits, and the predetermined data is stored as the pre-transmitted data.

Specifically, the target link M(t) at the current state is obtained, a conceptual tree model is established, and a similarity degree Si between a target link $M_i(t)$ of the $i^{th}$ subsequent operation situation that the user may have and the target link M(t) at the current state is calculated as follows:

$$S_i(M(t), M_i(t)) = \text{Weight}(B) = \frac{1}{a}\sum_{j=1}^{a} r_j^i;$$

wherein: $S_i$ (M(t), $M_i$(t)) is the similarity degree between the target link $M_i(t)$ of the $i^{th}$ subsequent operation situation and the target link M(t) at the current state; Weight(B) is a best matching weight; a is a matching number of B; and $r_j^i$ is a weight of the target link $M_i(t)$ of the $i^{th}$ subsequent operation situation corresponding to the $j^{th}$ matching parameter of the target link M(t) at the current state. The value of $r_j^i$ is calculated as follows:

$$r_j^i = \begin{cases} 1, & (M(t) = M_i(t)) \\ e^{-\mu l} \times \dfrac{e^{\varepsilon h} - e^{-\varepsilon h}}{e^{\varepsilon h} + e^{-\varepsilon h}}, & (M(t) \neq M_i(t)) \end{cases};$$

wherein, l represents a shortest path length of M(t) and $M_i$(t) in the conceptual tree; h represents a height of a same upper-layer concept closest to the M(t) and $M_i$(t) in the conceptual tree; and μ and ε are influence factors used to adjust l and h in the similarity degree calculation, and μ and ε are greater than or equal to 0.

After the similarity degree is calculated, a normalization process is performed to obtain a weight $U_i$ of the target link of the $i^{th}$ subsequent operation situation:

$$U_i = \frac{S_i(M(t), M_i(t))}{\sum_{i=1}^{n} S_i(M(t), M_i(t))};$$

wherein, n is the target links of n kinds of subsequent operation conditions that the user may have.

The greedy algorithm, i.e., GreedyKnapsack (D, h, $U_i$, $P_i$, X), is used to obtain the i value under an optimal solution, thereby determining the user's next operation, and the predicted data is stored to achieve the stability of the acceleration; wherein, D is a memory capacity, $P_i$ is a size of a memory occupied by the $i^{th}$ subsequent operation situation during use, and X is a number of data of the target link loaded into the memory.

The intelligent bridge acceleration system based on the dual-communication device of the present invention includes the dual-communication device and the intelligent network accelerator. The dual-communication device and the intelligent network accelerator are located in the same LAN, and are connected to each other in a communication mode. Specifically, when the intelligent network accelerator monitors that the online interactive application initiates the link at the household client-side, the intelligent network accelerator intercepts the data link, and forwards the data packet to the dual-communication device in the same LAN. Based on the dual-communication device, the intelligent network accelerator obtains the target link, the WiFi is used as the primary path to perform the data transmit-receive operations, and the WiFi transmission quality monitoring mechanism is enabled. When an abnormal data transmit-receive through the WiFi is monitored by the intelligent network accelerator using the enabled WiFi transmission quality monitoring mechanism, the dual-communication device starts the packet loss compensation strategy of the mobile data network, and the mobile data network is used as the secondary path for the data transmit-receive. When the intelligent network accelerator monitors that the data transmit-receive through the WiFi returns to normal, the dual-communication device stops the data transmit-receive operations through the secondary path; subsequently, the intelligent network accelerator continues to use the WiFi as the primary path to perform data transmit-receive operations. Therefore, the problem of the transmission lagging caused by poor quality of WiFi is solved, the stable and real-time data transmission is realized, and the data transmission quality is improved. For the user side, the user experience is improved; and for the service provider side, the loss brought by the poor quality of WiFi is reduced.

Those skilled in the art shall understand that the embodiments of the present invention may be implemented through a method, a system, or a computer program product. Therefore, the present invention may be implemented in a form of an entirely hardware embodiment, an entirely software embodiment, or an embodiment combining software and hardware.

The present invention is described by reference to process flow diagrams and/or block diagrams of a method, a device (system), and computer program products according to embodiments of the present invention. It should be understood that each process and/or block in the process flow diagrams and/or block diagrams and a combination of processes and/or blocks in the process flow diagrams and/or block diagrams can be implemented by instructions of the computer program. These instructions of the computer program can be provided to a processor of a general purpose computer, special purpose computer, embedded processor, or other programmable data processing device to produce a machine, so that, a device for implementing the functions specified in one or more processes in the process flow diagrams and/or one or more blocks in the block diagrams is produced through the instructions executed by a processor of a computer or other programmable data processing device.

These instructions of the computer program may also be stored in a computer readable memory that can guide a computer or other programmable data processing device to operate in a specific manner, so that the instructions stored in the computer readable memory produce manufactures containing an instruction device. The instruction device implements the functions specified in one or more processes in the process flow diagrams and/or one or more blocks in the block diagrams.

These instructions of the computer program may also be loaded onto a computer or other programmable data processing devices, such that a series of operational steps are performed on the computer or other programmable devices to produce computer-implemented processing, thereby the instructions executed on the computer or other programmable devices provide steps for implementing the functions specified in one or more processes in the process flow diagrams and/or one or more blocks in the block diagrams.

Apparently, those skilled in the art can make various modifications and variations to the present invention without departing from the spirit and scope of the present invention. Thus, if these modifications and variations of the present invention fall within the scope of the appended claims of the present invention and the equivalent technologies, the present invention is also intended to include such modifications and variations.

What is claimed is:

1. An intelligent bridge acceleration method based on a dual-communication device, wherein the method comprises the following steps:

when monitoring that an online interactive application initiates a link at a client-side household device, intercepting a data link, and forwarding a data packet to the dual-communication device in a same local area network (LAN);

obtaining a target link based on the dual-communication device; using WiFi as a primary path to perform a data transmit-receive operation; and enabling a WiFi transmission quality monitoring mechanism;

when an abnormal data transmit-receive through the WiFi is monitored by using an enabled WiFi transmission quality monitoring mechanism, start a packet loss compensation strategy of a mobile data network; and using the mobile data network as a secondary path for the data transmit-receive; when the data transmit-receive through the WiFi is monitored to return to normal, stopping the data transmit-receive operations through the secondary path; subsequently, continuing to use the WiFi as the primary path to perform the data transmit-receive operations, and continuing to perform a WiFi quality monitoring, wherein enabling the WiFi transmission quality monitoring mechanism comprises:

using a transmission function $W_1(t)$ to represent a data transmission of a WiFi communication mode in the LAN; and using a transmission function $W_2(t)$ to represent a data transmission of the mobile data network in the same LAN;

calculating a difference between an output result $C_i(t)$ and a convolution result of the input pulse function $\delta(t)$ and the transmission functions $W_1(t)$ and $W_2(t)$ to obtain a consistency factor $\eta_i$:

$\eta_i = C_i(t) - \int_{-\infty}^{+\infty} \delta(\tau) W_i(t-\tau) d\tau$; wherein, i=1 represents the WiFi communication mode, and i=2 represents the mobile data communication mode;

if $\eta_i = 0$, the two communication modes of WiFi and mobile data network are normal; and if $\eta_i \neq 0$, the two communication modes of WiFi and mobile data network are abnormal;

$\delta(t)$ is an input pulse function of dual path of a WiFi transmission path and a mobile data transmission path;

when detecting that the communication modes are normal, denoting an acquired target link as $M(t)$, monitoring the WiFi transmission quality in real time and recording the WiFi transmission quality as $Z(t)$; and comparing a monitored WiFi transmission quality $Z(t)$ with a preset transmission quality threshold $Z_o$, wherein when $Z(t)$ is greater than or equal to $Z_o$, the data transmit-receive through the WiFi transmission path is determined to be normal; and when $Z(t)$ is smaller than $Z_o$, the data transmit-receive through the WiFi transmission path is determined to be abnormal.

2. The intelligent bridge acceleration method based on the dual-communication device according to claim 1, wherein enabling the WiFi transmission quality monitoring mechanism, and continuing to perform the WiFi quality monitoring comprise:

predicting a WiFi transmission quality based on a short-term transmission flow of a linear model, and performing a transmission flow abnormal monitoring on the WiFi based on a prediction result of the short-term transmission flow;

wherein, the predicting of the WiFi transmission quality based on the short-term transmission flow of the linear model comprises:

constructing a flow prediction model using a time series model as follows:

$$x_t = a_t x_{t-1} + \alpha_{t-2} x_{t-2} + \ldots + \alpha_{t-n} x_{t-n} + \varepsilon_t + b_{t-1} \varepsilon_{t-1} + b_{t-2} \varepsilon_{t-2} + \ldots + b_{t-m} \varepsilon_{t-m};$$

wherein, $x_t$ is a flow on a link at a time point of t, $x_{t-1}$ is a flow on the link at a time point of t−1, and so forth, $x_{t-n}$ is a flow on the link at a time point of t−n; $\varepsilon_n$ is a random perturbation, satisfying a normal distribution with a mean value of 0 and a standard deviation of $\sigma$; $\varepsilon_{t-1}, \varepsilon_{t-2}, \ldots, \varepsilon_{t-m}$ are random perturbations with a mean value of 0 and a variance of $\sigma$; and coefficients $\alpha_t, \alpha_{t-1}, \alpha_{t-2}, \ldots, \alpha_{t-n}, b_{t-1}, b_{t-2}, \ldots, b_{t-m}$ of the time series model are obtained by a maximum likelihood estimation method using the historical data; n is a number of time units for which historical data is lagged;

using the time series model to perform a link flow prediction in advance by h steps;

using predicted data and the historical data to construct a linear model as follows simultaneously:

$y = X\beta + \in;$ in the linear model, y is a link flow value, variable X is a $(n+h-p+1) \times p$ matrix, $\in \in N(0, \sigma^2 I)$, $\beta$ is $p \times 1$ vector, and $\beta = [\beta_0 \beta_1 \ldots \beta_{p-1}]$; when building the linear model, the historical data is obtained successively in a sliding window with a length of p; assuming that there are (n+h) data, a total of (n+h−p+1) data segments are obtained using p as the sliding window;

the matrix X is a $(n+h-p+1) \times p$ matrix, and a least square method is used to obtain a $\beta$ vector:

$\beta = (X^T X)^{-1} X^T y;$ using the $\beta$ vector to calculate an estimated value of y:

$\hat{y} = X\beta = X(X^T X)^{-1} X^T y = Hy;$ where, $H = X(X^T X)^{-1} X^T$;

H represents a projection matrix; $h_i = x_i^T (X^T X)^{-1} x_i$ is defined as a leverage value of the $i^{th}$ data segment in the X matrix; and the larger the leverage value, the larger the data deviates from a normal range;

calculating a Cook's distance of the data segment at the time point of t as:

$$D_t = \frac{\sum_{j=1}^{n+h-p+1} (\hat{y}_j - \hat{y}_{-t})}{p[(n+h+1)^{-1} e^T e]^2};$$

wherein, $\hat{y}_{-t}$ represents a value of a model obtained after the data segment at the time point of t is removed, e is an average squared error vector of the model, and $e = y - \hat{y} = (I-H)y$; or $D_t$ is calculated by the following expression:

$$D_t = \frac{e_t^2}{[(n+h+1)^{-1}e^T e]^2} \left[\frac{h_t}{(1-h_t)^2}\right];$$

using the historical data in a predetermined period of time to determine a changing direction of the link flow; and when a probability of an abnormality of the link flow is identified to be greater than a preset threshold according to a value of $D_t$ and the changing direction of the link flow, performing a switching preparation operation from a WiFi network link to a mobile data network link.

3. The intelligent bridge acceleration method based on the dual-communication device according to claim 2, wherein the method further comprises the following steps:
gathering data sent from a dual-channel data transmission path based on the dual-communication device to a server-side of an intelligent network accelerator, and then forwarding the data to a target server by the server-side of the intelligent network accelerator;
wherein, the dual-channel data transmission path comprises: a transmission path using the WiFi as a primary path for transmitting and receiving data, and a transmission path using the mobile data network as a secondary path for transmitting and receiving data.

4. The intelligent bridge acceleration method based on the dual-communication device according to claim 1, wherein forwarding the data packet to the dual-communication device in the same LAN comprises:
searching a history record, and selecting a corresponding dual-communication device according to the history record; if there is no used dual-communication device in the history record, automatically matching and adding a dual-communication device matching a current online interactive application.

5. The intelligent bridge acceleration method based on the dual-communication device according to claim 4, wherein searching the history record, and selecting the corresponding dual-communication device according to the history record comprises:
searching the history record, if there are used dual-communication devices in the history record, identifying a number of the used dual-communication devices;
if there is only one used dual-communication device in the history record, directly selecting the used dual-communication device;
if there are multiple used dual-communication devices in the history record, displaying all of the multiple used dual-communication devices in the history record for users to select; and
selecting a corresponding dual-communication device according to a selection instruction triggered by the users;
or, selecting a dual-communication device with a highest priority by referring to priorities of all of the multiple used dual-communication devices in the history record;
or, according to the historical record, determining a mobile network communication quality corresponding to all of the dual-communication devices in the history record, and selecting a dual-communication device with a best mobile network communication quality.

6. The intelligent bridge acceleration method based on the dual-communication device according to claim 4, wherein the method further comprises the following steps:
gathering data sent from a dual-channel data transmission path based on the dual-communication device to a server-side of an intelligent network accelerator, and then forwarding the data to a target server by the server-side of the intelligent network accelerator;
wherein, the dual-channel data transmission path comprises: a transmission path using the WiFi as a primary path for transmitting and receiving data, and a transmission path using the mobile data network as a secondary path for transmitting and receiving data.

7. The intelligent bridge acceleration method based on the dual-communication device according to claim 5, wherein the method further comprises the following steps:
gathering data sent from a dual-channel data transmission path based on the dual-communication device to a server-side of an intelligent network accelerator, and then forwarding the data to a target server by the server-side of the intelligent network accelerator;
wherein, the dual-channel data transmission path comprises: a transmission path using the WiFi as a primary path for transmitting and receiving data, and a transmission path using the mobile data network as a secondary path for transmitting and receiving data.

8. The intelligent bridge acceleration method based on the dual-communication device according to claim 1, wherein the method further comprises the following steps:
predetermining the data according to user's operating habits, and storing predetermined data as pre-transmitted data;
obtaining a target link M(t) at a current state, establishing a conceptual tree model, and calculating a similarity degree $S_i$ between a target link $M_i(t)$ of a $i^{th}$ subsequent operation situation that the user may have and the target link M(t) at the current state as follows:

$$S_i(M(t), M_i(t)) = \text{Weight}(B) = \frac{1}{a}\sum_{j=1}^{a} r_j^i;$$

wherein, $S_i(M(t), M_i(t))$ is a similarity degree between the target link $M_i(t)$ of the $i^{th}$ subsequent operation situation and the target link M(t) at the current state; Weight(B) is a best matching weight; a is a matching number of B; and $r_j^i$ is a weight of the target link $M_i(t)$ of the $i^t$ subsequent operation situation corresponding to a $j^{th}$ matching parameter of the target link M(t) at the current state; a value of $r_j^i$ is calculated as follows:

$$r_j^i = \begin{cases} 1, & (M(t) = M_i(t)) \\ e^{-\mu l} \times \frac{e^{\varepsilon h} - e^{-\varepsilon h}}{e^{\varepsilon h} + e^{-\varepsilon h}}, & (M(t) \neq M_i(t)) \end{cases};$$

wherein, l represents a shortest path length of M(t) and $M_i(t)$ in the conceptual tree; h represents a height of a same upper-layer concept closest to the M(t) and $M_i(t)$ in the conceptual tree; and $\mu$ and $\varepsilon$ are influence factors used to adjust l and h when calculating the similarity degree, and $\mu$ and $\varepsilon$ are greater than or equal to 0;
after the similarity degree is calculated, performing a normalization process to obtain a weight $U_i$ of the target link of the $i^{th}$ subsequent operation situation:

$$U_i = \frac{S_i(M(t), M_i(t))}{\sum_{i=1}^{n} S_i(M(t), M_i(t))};$$

wherein, n is target links of n kinds of subsequent operation conditions that the user may have; and using a greedy algorithm, GreedyKnapsack (D, h, $U_i$, $P_i$, X), to obtain a value of i under an optimal solution, determining user's next operation, and storing predicted data to achieve a stable acceleration; and wherein, D is a memory capacity, $P_i$ is a size of a memory occupied by the $i^{th}$ subsequent operation situation during use, and X is a number of data of a target link loaded into the memory.

9. The intelligent bridge acceleration method based on the dual-communication device according to claim 8, wherein the method further comprises the following steps:
gathering data sent from a dual-channel data transmission path based on the dual-communication device to a server-side of an intelligent network accelerator, and then forwarding the data to a target server by the server-side of the intelligent network accelerator;
wherein, the dual-channel data transmission path comprises: a transmission path using the WiFi as a primary path for transmitting and receiving data, and a transmission path using the mobile data network as a secondary path for transmitting and receiving data.

10. The intelligent bridge acceleration method based on the dual-communication device according to claim 1, wherein the method further comprises the following steps:
gathering data sent from a dual-channel data transmission path based on the dual-communication device to a server-side of an intelligent network accelerator, and then forwarding the data to a target server by the server-side of the intelligent network accelerator;
wherein, the dual-channel data transmission path comprises: a transmission path using the WiFi as a primary path for transmitting and receiving data, and a transmission path using the mobile data network as a secondary path for transmitting and receiving data.

11. The intelligent bridge acceleration method based on the dual-communication device according to claim 1, further comprises:
predicting a WiFi transmission quality based on a short-term transmission flow of a linear model, and performing a transmission flow abnormal monitoring on the WiFi based on a prediction result of the short-term transmission flow.

12. An intelligent bridge acceleration system based on a dual-communication device, wherein the system comprises:
a household device; and
a dual-communication device; wherein the household device and the dual-communication device is respectively installed with an intelligent network accelerator; the household device and the dual-communication device are located in a same LAN, and are connected to each other in a communication mode; wherein,
the intelligent network accelerator is configured to intercept a data link, and forward a data packet to the dual-communication device in a same LAN, when an online interactive application is monitored to initiate a link at a client-side household device;
based on the dual-communication device, the intelligent network accelerator obtains a target link, a WiFi is used as a primary path to perform data transmit-receive operations, and a WiFi transmission quality monitoring mechanism is enabled;
when an abnormal data transmit-receive through the WiFi is monitored by the intelligent network accelerator using an enabled WiFi transmission quality monitoring mechanism, the dual-communication device starts a packet loss compensation strategy of a mobile data network, and the mobile data network is used as a secondary path for the data transmit-receive; when the intelligent network accelerator monitors that the data transmit-receive through the WiFi returns to normal, the dual-communication device stops the data transmit-receive operations through the secondary path; subsequently, the intelligent network accelerator continues to use the WiFi as the primary path to perform the data transmit-receive operations, and continues to perform a WiFi quality monitoring, wherein
the intelligent network accelerator enabling the WiFi transmission quality monitoring mechanism comprises:
using a transmission function $W_1(t)$ to represent the data transmission of the WiFi communication mode in LAN; and using a transmission function $W_2(t)$ to represent the data transmission of the mobile data network in the same LAN;
calculating a difference between an output result $C_i(t)$ and a convolution result of the input pulse function $\delta(t)$ and the transmission functions $W_1(t)$ and $W_2(t)$ d to obtain a consistency factor $\eta_i$:
$\eta_i = C_i(t) - \int_{-\infty}^{+\infty} \delta(\tau) W_i(t-\tau) d\tau$; wherein, i=1 represents the WiFi communication mode, and i=2 represents the mobile data communication mode;
if $\eta_i=0$, the two communication modes of WiFi and mobile data network are normal;
if $\eta_i \neq 0$, the two communication modes of WiFi and mobile data network are abnormal;
$\delta(t)$ is an input pulse function of dual path of a WiFi transmission path and a mobile data transmission path;
when the communication modes are detected to be normal, denoting an acquired target link as M(t), monitoring the WiFi transmission quality in real time, and recording the WiFi transmission quality as Z(t); and
comparing a monitored WiFi transmission quality Z(t) with a preset transmission quality threshold $Z_0$, wherein
when Z(t) is greater than or equal to $Z_0$, the data transmit-receive through the WiFi transmission path is determined to be normal; and
when Z(t) is smaller than $Z_0$, the data transmit-receive through the WiFi transmission path is determined to be abnormal.

13. The intelligent bridge acceleration system based on the dual-communication device according to claim 12, wherein the intelligent network accelerator enabling the WiFi transmission quality monitoring mechanism, and continuing to perform the WiFi quality monitoring comprise the following steps:
predicting a WiFi transmission quality based on a short-term transmission flow of a linear model, and performing a transmission flow abnormal monitoring on the WiFi based on a prediction result of the short-term transmission flow;
wherein, the predicting of the WiFi transmission quality based on the short-term transmission flow of the linear model comprises:

constructing a flow prediction model using a time series model as follows:

$$x_t = a_t x_{t-1} + a_{t-2} x_{t-2} + \ldots + a_{t-n} x_{t-n} + \varepsilon_t + b_{t-1} \varepsilon_{t-1} + b_{t-2} \varepsilon_{t-2} + \ldots + b_{t-m} \varepsilon_{t-m};$$

wherein, $x_t$ is a flow on a link at a time point of t, $x_{t-1}$ is a flow on the link at a time point of t−1, and so forth, $x_{t-n}$ is a flow on the link at a time point of t−n; $\varepsilon_n$ is a random perturbation, satisfying a normal distribution with a mean value of 0 and a standard deviation of σ; $\varepsilon_{t-1}, \varepsilon_{t-2}, \ldots, \varepsilon_{t-m}$ are random perturbations with a mean value of 0 and a variance of σ; and coefficients $\alpha_t, \alpha_{t-1}, \alpha_{t-2}, \ldots, \alpha_{t-n}, b_{t-1}, b_{t-2}, \ldots, b_{t-m}$ of the time series model are obtained by a maximum likelihood estimation method using the historical data; n is a number of time units for which historical data is lagged;

performing the link flow prediction in advance by h steps through using the time series model;

constructing a linear model by using predicted data and the historical data simultaneously as follows:

$$y = X\beta + \in;$$

wherein in the linear model, y is a link flow value, variable X is (n+h−p+1)×p matrix, $\in \in N(0,\sigma^2 I)$, β is p×1 vector, and $\beta = [\beta_0 \beta_1 \ldots \beta_{p-1}]$; when the linear model is constructed, the historical data are obtained successively in a sliding window with a length of p; and a number of data is assumed to be (n+h), then a total of (n+h−p+1) data segments are obtained using p as the sliding window;

the matrix X is a (n+h−p+1)×p matrix, and a least square method is used to obtain a β vector as follows:

$$\beta = (X^T X)^{-1} X^T y;$$

using the β vector to calculate an estimated value of y:

$$\hat{y} = X\beta = X(X^T X)^{-1} X^T y = Hy; \text{ where, } H = X(X^T X)^{-1} X^T;$$

H represents a projection matrix; $h_i = x_i^T (X^T X)^{-1} x_i$ is defined as a leverage value of the $i^{th}$ data segment in the X matrix; and the larger the leverage value, the larger the data deviates from a normal range;

calculating a Cook's distance of a data segment at the time point of t:

$$D_t = \frac{\sum_{j=1}^{n+h-p+1}(\hat{y}_j - \hat{y}_{-t})}{p[(n+h+1)^{-1} e^T e]^2};$$

wherein, $\hat{y}_{-t}$ represents a value of a model obtained after the data segment at the time point of t is removed, e is an average squared error vector of the model, and $e = y - \hat{y} = (I-H)y$; or $D_t$ is calculated by the following expression:

$$D_t = \frac{e_t^2}{[(n+h+1)^{-1} e^T e]^2} \left[\frac{h_t}{(1-h_t)^2}\right];$$

determining a changing direction of the link flow by using the historical data in a predetermined period of time; and when a probability of the abnormality of the link flow is identified to be greater than a preset threshold according to a numerical value of $D_t$ and the changing direction of the link flow, performing a switching preparation operation from the a WiFi network link to the a mobile data network link.

14. The intelligent bridge acceleration system based on the dual-communication device according to claim 13, wherein the intelligent network accelerator enabling the WiFi transmission quality monitoring mechanism comprises:

using a transmission function $W_1(t)$ to represent the data transmission of the WiFi communication mode in LAN; and using a transmission function $W_2(t)$ to represent the data transmission of the mobile data network in the same LAN;

calculating a difference between an output result $C_i(t)$ and a convolution result of the input pulse function $\delta(t)$ and the transmission functions $W_1(t)$ and $W_2(t)$ d to obtain a consistency factor $\eta_i$:

$\eta_i = C_i(t) - \int_{-\infty}^{+\infty} \delta(\tau) W_i(t-\tau) d\tau$; wherein, i=1 represents the WiFi communication mode, and i=2 represents the mobile data communication mode;

if $\eta_i = 0$, the two communication modes of WiFi and mobile data network are normal;

if $\eta_i \neq 0$, the two communication modes of WiFi and mobile data network are abnormal;

$\delta(t)$ is an input pulse function of dual path of a WiFi transmission path and a mobile data transmission path;

when the communication modes are detected to be normal, denoting an acquired target link as M(t), monitoring the WiFi transmission quality in real time, and recording the WiFi transmission quality as Z(t); and comparing a monitored WiFi transmission quality Z(t) with a preset transmission quality threshold $Z_0$, wherein when Z(t) is greater than or equal to $Z_0$, the data transmit-receive through the WiFi transmission path is determined to be normal; and when Z(t) is smaller than $Z_0$, the data transmit-receive through the WiFi transmission path is determined to be abnormal.

15. The intelligent bridge acceleration system based on the dual-communication device according to claim 12, further comprises predicting a WiFi transmission quality based on a short-term transmission flow of a linear model, and performing a transmission flow abnormal monitoring on the WiFi based on a prediction result of the short-term transmission flow.

* * * * *